Nov. 10, 1959     Z. POSPIŠIL ET AL     2,912,649
DEVICE FOR ACCURATE MEASUREMENT AND RECORDING
OF A SLOWLY INCREASING OR DECREASING VOLTAGE
Filed July 3, 1957
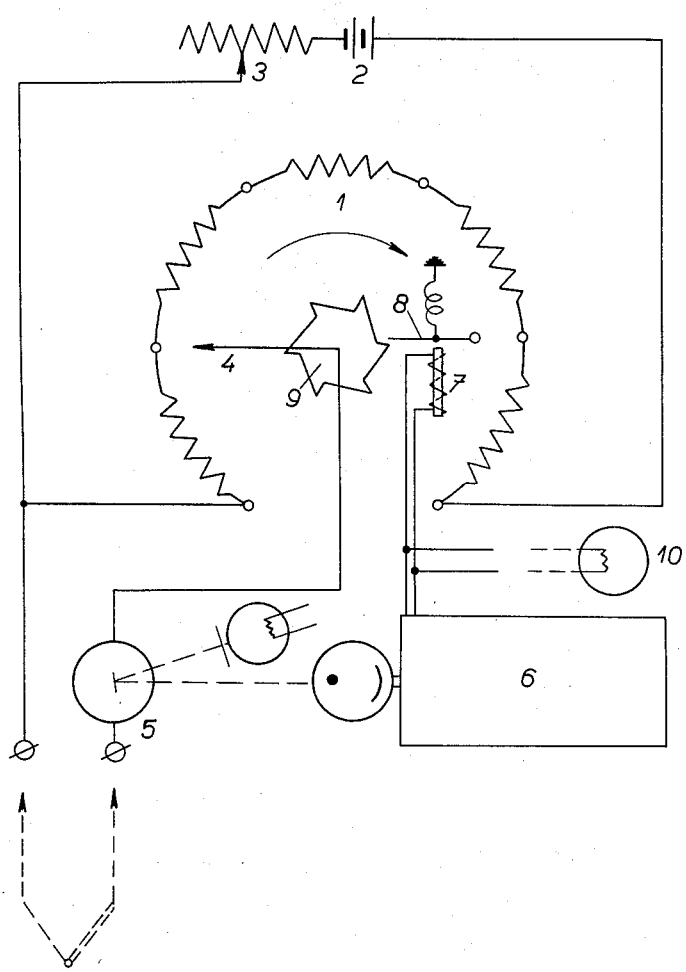
INVENTORS
Zdenek Pospisil    Milan Beranek
BY
Richard Low
Ag't

United States Patent Office 2,912,649
Patented Nov. 10, 1959

2,912,649

DEVICE FOR ACCURATE MEASUREMENT AND RECORDING OF A SLOWLY INCREASING OR DECREASING VOLTAGE

Zdeněk Pospíšil, Hradec Kralove, and Milan Beránek, Prague, Czechoslovakia, assignors to Tesla, narodni podnik, Prague, Czechoslovakia Application July 3, 1957, Serial No. 669,826

3 Claims. (Cl. 324—99)

This invention relates to a device for accurate measurement and recording of a slowly increasing or decreasing voltage, for example of the E.M.F. of a thermocouple, by means of a voltage divider in a potentiometer circuit arrangement, the voltage of which can be changed in steps, in combination with a sensitive null indicator, for example a mirror galvanometer.

In research laboratories it is often necessary to record the changes of certain properties of a tested sample in dependence on temperature which is measured by means of a thermocouple. The change of the examined property is usually recorded as a function of time. The temperature corresponding to each point of the corresponding curve is recorded by a suitable known method, for example: The temperature or the E.M.F. of the thermocouple is measured by means of a millivoltmeter or a compensation potentiometer. At certain values indicated by the measuring instrument, a recording sign is manually entered in the recording material.

Various automatic devices are also known in which the temperature curve is also entered in the recording tape, and from this curve the temperature of each individual point of the main curve can be read off. Such temperature recording uses exclusively pointer instruments which, however, are not very suitable for an accurate temperature measurement. In addition, reading off the curve introduces additional errors.

Object of this invention is a device in which the temperature measurement is based on the principle of a compensator. The registration signs are entered automatically by photographic or mechanical means as soon as the temperature reaches a certain predetermined value.

The electrical impulses created in the device when certain temperatures are reached, may also be used for accomplishing automatically other steps, such as switching off the device, warning the operator and the like.

In accordance with the invention the device for accurate measurement and recording of a slowly increasing or decreasing electrical voltage, for example of the E.M.F. of a thermocouple by means of a sensitive null indicator, for example a mirror galvanometer, is characterized by the fact that the null indicator and a voltage divider in a potentiometer circuit arrangement whose voltage is supplied from a battery or other source through a regulating resistor, are so connected that the partial voltage which acts against the slowly increasing measured voltage brings the null indicator into zero position where a current impulse is produced in a suitable manner, for example by means of a photo-electric relay; this impulse moves the wiper of the voltage divider to the next higher partial voltage, for example by means of an electromagnet, its armature and a ratchet wheel, whereby the null indicator is deviated from its zero position into which it is again returned by the slowly increasing measured voltage, the said impulse causing entering of a sign in the recording device by optical, mechanical or any other suitable means.

Another electrical impulse which can be derived from the arbitrarily adjustable values of the voltage divider by means of a second wiper sliding over a second contact bank in synchronism with the main wiper, may be used for stopping the device, or controlling the same, or for any other steps, such as the transmission of a warning signal to the operator, and the like.

The invention will be best understood from the following specification to be read in conjunction with the accompanying drawing illustrating a preferred example of embodiment.

Referring to the accompanying figure, the ohmic voltage divider 1 which is arranged as a potentiometer, is fed from a battery 2 through a regulating resistor 3, and it is balanced against the E.M.F. of a Weston cell. The component resistors of the voltage divider 1 are selected, for example, in such a manner that the tapped off voltages correspond always to a full hundred degrees, or to another round value. The wiper 4 is always placed against the contact which corresponds to the next higher temperature value with respect to the temperature of the sensitive joint of the thermocouple. As soon as the temperature reaches this value, the bridge is balanced, whereby the light signal of the mirror galvanometer 5 is set to zero. In this position there is located a photorelay 6 which transmits an electrical impulse which causes the wiper 4 to move to the next contact, by means of magnet 7, its armature 8 and the ratchet wheel 9. Other suitable means for moving the wiper may of course also be used. Simultaneously, the lamp 10 is lit and illuminates a slit in the photographic recording drum, or sets a device into action which enters mechanically a sign in the recording tape.

It is also possible to use another wiper which picks up an impulse from another contact bank when an arbitrarily adjustable degree is reached. This impulse may be used, for example, to stop the device, or to activate a signalling device and the like.

The fundamental component part of the whole device comprising several contact banks and corresponding wipers activated through an electromagnet by means of electrical impulses, may be supplied by a uniselector of the usual design employed in telephone techniques.

The device which has been described in connection with temperature recording by means of a thermocouple may also be used for controlling and recording of a slowly increasing or decreasing voltage derived from any source.

What we claim is:

1. A device for accurate measurement and recording of a slowly varying electrical voltage, comprising a bridge circuit including a potentiometer having a series of resistances and a wiper movable over said resistances, a source of adjustably constant voltage connected across said series of resistances so that said potentiometer acts as a step-by-step variable voltage divider, input terminals for receiving the variable voltage to be measured and recorded, a null indicator connected between said input terminals and said potentiometer so that said indicator compares the divided voltage from said potentiometer with the variable voltage to be measured and recorded, means for emitting a control impulse when said null indicator occupies a position corresponding to balancing of said bridge circuit by the variable voltage to be measured and recorded equalling said divided voltage, actuating means for said wiper of the potentiometer responding to said control impulse to move said wiper and thereby change said divided voltage for again unbalancing said bridge circuit, and recording means also actuated by said control impulse.

2. A device as in claim 1, wherein said null indicator is a mirror galvanometer and said means for emitting a control impulse includes a photo-cell energized by light from said mirror galvanometer when said bridge circuit is balanced.

3. A device as in claim 2; wherein said actuating means includes a ratchet rotatable with said wiper, an actuating pawl engageable with said ratchet, and an electromagnet energized by said control impulse to operate said pawl.

References Cited in the file of this patent

UNITED STATES PATENTS 1,822,075     Aronoff _____ Sept. 8, 1931

OTHER REFERENCES

Publication: Electronic Design, August 1955, pages 44–47.